United States Patent [19]
Dennis et al.

[11] Patent Number: 5,999,292
[45] Date of Patent: Dec. 7, 1999

[54] SAGNAC INTERFEROMETER AMPLITUDE MODULATOR BASED DEMULTIPLEXER

[75] Inventors: Michael L. Dennis, Alexandria; Irl N. Duling, III, Round Hill; William K. Burns, Alexandria, all of Va.

[73] Assignee: The United States of America as represented by the Secretary of the Navy, Washington, D.C.

[21] Appl. No.: 09/026,819

[22] Filed: Feb. 20, 1998

[51] Int. Cl.$^6$ ..................................................... H04J 14/08
[52] U.S. Cl. ......................... 359/138; 359/139; 359/140
[58] Field of Search ................................. 359/119, 135, 359/138, 139, 173, 188, 140; 385/24

[56] References Cited

U.S. PATENT DOCUMENTS

| | | | |
|---|---|---|---|
| 5,144,375 | 9/1992 | Gabriel et al. | 356/345 |
| 5,329,393 | 7/1994 | Huang | 359/135 |
| 5,357,359 | 10/1994 | Uchiyama et al. | 359/123 |
| 5,377,284 | 12/1994 | Bulow | 385/11 |
| 5,442,474 | 8/1995 | Huang et al. | 359/139 |
| 5,473,712 | 12/1995 | Blow et al. | 385/16 |
| 5,485,298 | 1/1996 | Haas | 359/139 |
| 5,486,943 | 1/1996 | Sasayama et al. | 359/123 |
| 5,493,433 | 2/1996 | Prucual et al. | 359/123 |
| 5,602,862 | 2/1997 | Barnsley et al. | 372/145 |
| 5,625,479 | 4/1997 | Suzuki et al. | 359/135 |
| 5,646,759 | 7/1997 | Lichtman et al. | 359/138 |
| 5,654,812 | 8/1997 | Suzuki | 359/139 |

OTHER PUBLICATIONS

Morioka et al., Ultrafast Polarization–Independent Optical Demultiplexer Using Optical Carrier Frequency Shift Through Crossphase Modulation, Elec. Ltrs vol. 28, No. 11, pp. 1070–1072, May 1992.

Glesk et al., Demonstration of All– Optical Demultiplxing of TDM Data at 250 GBIT/S, Elec. Ltrs. vol. 30, No. 4, MP339—341, FEE 1994.

Blow et al., Demonstration of the Nonlinear Fibre Loop Mirror as an Ultrafast All– Optical Demultiplexer, Elec. Ltrs vol. 26, No. 14, pp. 962–964, Jul. 1990.

Prucnal et al., 12.5 GBIT/S Fibre–Optic Network Using All–Optical Processing, Elec. Ltrs. vol. 23, No. 12, pp. 629–630, Jun. 1987.

Blow et al., Two–Wavelength Operation of the Nonlinear Fibre Loop Mirror Optic Ltrs vol. 15, No. 4, pp. 248–250, Feb. 1990.

Blow et al., Experimental Demonstration of Optical Soliton Switching in an All–Fiber Nonlinear Sagnac Interferometer, Optics Ltrs vol. 14, No. 14, pp. 754–756, Jul. 1989.

Tucker et al., Optical Time–Division Mltiplexing for Very High Bit–Rate Transmission, V. or Lightwave Tech. vol. 6, No. 11, pp. 1737–1749. Nov. 1988.

Jinno et al., Nonlinear Sagnac Interferometer Switch and its Applications, J. of Quartum Elec. vol. 28, No. 4, pp. 875–882, Apr. 1992.

Sokoloff et al., Aterahert Z Optical Asymmetric Demultiplexer (Toad), IEEE Trans. Photonics Tech. Ltrs, vol. 5, No. 7, pp. 787–790, Jul. 1993.

Mori et al., All–Optical Paulitstage Demultiplexers Operated by Logical Permutations of Control Pulses, IEE Trans Photonic Ltrs, vol. 3, No. 12, pp. 1130–1133, Dec. 1991.

(List continued on next page.)

*Primary Examiner*—Leslie Pascal
*Attorney, Agent, or Firm*—Barry A. Edelberg; Charles J. Stockstill

[57] ABSTRACT

This invention is a demultuplexer consisting on a sequential division of the data stream in a series of Sagnac interferometer amplitude modulators (SIAMs), wherein each modulator in the series is driven by a single microwave frequency derived directly from a radio frequency (RF) data rate clock, with the RF phase properly adjusted to extract a channel of interest.

16 Claims, 8 Drawing Sheets

OTHER PUBLICATIONS

Multer–Orr et al., 20 GHZ Optical WaveGuide Sampler, IEEE J. of Qualtum Elec., vol. QE–19, No. 12, pp. 1877–1883, Dec. 1983.

Kawanishi et al., 100 GBIT/S All–Optical Demultiplexing Using Four–Wave Mixing in a Travelling Wave Laser Diode Amplifier, Elec. Ltrs vol. 30, No. 12, pp. 981–982, Jun. 1994.

Patrick et al., Bit–Rate Flexible All–Optical Demultiplexing Using a Nonlinear Optical Loop Mirror, Elec. Ltrs. vol. 29, No 8, pp. 702–703, Apr., 1993.

Ellis et al., Transmission of a True Single Polarisation 40 GBIT/S Soliton Data Signal Over 205 KM Using a Stabilis Erbium Fibre Ring Laser and 40GHZ Electronic Timing Recovery, Elec. Ltrs. vol. 29, No. 11, pp. 990–991, May 1993.

Fang et al., A DC to Multigiga Bit/S Polarization– Independent Modulator Based on a Sagnac Interperometer, J. Lightwave Techn., vol. 15, No. 11, pp. 2166–2171, Nov. 1997.

Iwatsuki et al., 60 GB/S X 2 CH Time/Polarization–Mltiplexed Soliton Transmission Over 154KM Utilizing an Adiabatically Compressed, Gain–Switched, DFB–LD Pulse Source, IEEE–Photonics Ltrs, vol. 6, No. 11, pp. 1377–1379, Nov. 1994.

Dennis et al., Soliton Loop Mirror Demultiplexer Using Orthogonally Polarized Signal and Control, IEEE J. Photonics Ltrs, vol. 8, No. 7, pp. 906–908, Jul. 1996.

Carruthers et al., 10–GHZ, 1.3–P5 Erbium Fiber Laser Employing Soliton Pulse Shortening, Optics Ltrs, vol. 21, No. 23, pp. 1927–1929, Dec. 1996.

MODULATION, TRANSMISSION OUTPUT DATA STREAM

SAGNAC INTERFEROMETER AMPLITUDE MODULATOR BASED DEMULTIPLEXER

BACKGROUND OF THE INVENTION

1. Field of the Invention

This invention pertains generally to data multiplexers and more specifically to a Sagnac interferometer amplitude modulator based demultiplexer for high-speed return-to-zero optical time division multiplexed data.

2. Description of the Related Art

Due to the speed limitations of electronic circuitry, future time division multiplexed optical communications networks operating at data rates in the order of 100 Gbits/s will require optical demultiplexing techniques. Toward this end, a variety of all-optical demultiplexing schemes, based on third order nonlinearities in fiber or on resonant nonlinearities in semiconductors, have been proposed and demonstrated. These require a local optical clock to drive the demultiplexing; furthermre, many (those based on nonlinearities in fiber) suffer from a long latency between receipt and decoding of the data.

Modulator based demultiplexing schemes have been previously proposed, and demonstrated with speeds up to 40 Gbit/s. These have depended on Mach-Zehnder lithium niobate intensity modulators, which are well known to suffer from bias instability with changes in environmental conditions and applied voltage.

The standard integrated optic intensity modulator consists of a channel microwave Mach-Zehnder interferometer fabricated on a lithium niobate substrate. The Mach-Zehnder interferometer consists of an input waveguide which branches to a pair of parallel optical waveguides (a"Y-branch"), at least one of which is positioned under an electrode so that its optical path length may be varied by an applied voltage, via the electro-optic effect. The two waveguides are combined at the output(at a second Y-branch, oriented to combine the light in the two waveguides), where the light interferes according to the differential optical phase imposed by the applied voltage. However, the tolerances involved in the fabrication of the input and output Y-branches restrict the ON/OFF extinction ratio to ~20 dB. This is due both to the splitting ratio between the two arms being other than 50%, and to the fact that the splitting ratios of the two branches are typically unequal.

The problem of bias drift is ubiquitous with Mach-Zehnder modulators. The phenomenon stems from fundamental material properties of the $LiNbO_3$ substrate, in combination with the topology of the Mach-Zehnder interferometer. The transfer function of a Mach-Zehnder interferometer (or indeed any interferometer) depends on the optical path length difference (differential phase) between its two arms as a squared-sinusoid. Since the two optical paths in the Mach-Zehnder interferometer are independent, the differential phase between them in the absence of an applied voltage is arbitrary. For effective modulation, a specific initial phase is required; in Mach-Zehnder devices, this is accomplished by applying a direct current (DC), or bias, voltage in addition to the alternating current (AC) modulation. However, the $LiNbO_3$ substrate is a piezoelectric, electro-optical material, with a small but significant electrical conductivity. Thus, the substrate transduces the applied bias voltage and changes in a variety of environmental conditions (including temperature, mechanical stress, humidity) into an optical path length difference between the two interferometer arms which varies in time. This is the bias drift which must be tracked with compensating electronic feedback to the applied DC voltage for the modulator to operate at a fixed bias phase.

Optical time division multiplexing (OTDM) is a technique for transmitting data over optical fibers at very high data rates (e.g., 100 Gbit/s) by temporally interleaving multiple slower rate (e.g., 10 Gbit/s) data streams. This technique allows access to the virtually unlimited bandwidth of the optical fiber transmission medium, despite the fact that the electronics used to generate and encode the data are relatively narrowband.

The multiplexing (MUX) process is the conversion of relatively slow speed parallel data streams to a single very high speed serial stream. While it is relatively trivial to construct a high speed OTDM data stream, decoding that data once it reaches its destination is much more difficult. The data speed is well beyond the capabilities of electronics, either at present or in the foreseeable future. In order to decode the data, some means is required for extracting a single low speed data channel from the high speed stream, or, more generally, for converting the high speed serial data back into the several lower speed parallel channels. This process is known as demultiplexing (DMUX). Over the past few years, a number of schemes have been demonstrated capable of demuliplexing 100 Gbit/s data. These have universally relied on using some optical correlation scheme, wherein a local optical clock signal is combined with the incoming optical data stream in a nonlinear optical medium. Examples include four-wave mixing and cross-phase modulation in optical fiber and semiconductor laser amplifiers.

All of these techniques rely on an optical clock signal, consisting of a high peak power pulsed laser with a repetition rate equal to the data rate of the individual channels. Generating this optical clock stream adds a great deal of complexity and expense to the demultiplexing process. Furthermore, the previously demonstrated schemes are capable of demultiplexing only a single data channel, so that as many demultiplexers as there are TDM data channels would be required to decode the entire data stream. The nature of the optical nonlinearities involved normally dictate that the optical clock consist of a stream of short (e.g., 1–3 ps), high peak power (1–10 W) pulses of light. An example of such a demultiplexer is the polarization multiplexed nonlinear optical loop mirror (NOLM DEMUX) developed by the Naval Research Laboratory. See, Dennis et al., SOLITON LOOP MIRROR DEMULTIPLEXER USING ORTHOGONALLY POLARIZED SIGNAL AND CONTROL, Photon. Technol. Lett Vol. 8, No.7, pp. 906–908, 1996. The optical nonlinearity is the Kerr effect (cross phase modulation) in optical fiber, which is extremely weak. The optical clock in this device consists of an actively mode locked fiber laser using a high power optical amplifier with feedback stabilization to maintain suitable operation. This clock is extremely expensive and would be prohibitive if such a device were required at every node in a network where demultiplexing is required.. The weak nonlinearity in optical fiber dictates that very long lengths (e.g., 5–10 km) be used to obtain sufficiently efficient switching, even with the high peak power optical clock sources. This introduces a substantial delay (20–25 $\mu$s) between the arrival and decoding of the data by the receive node.

Demultiplexing schemes based on optical nonlinearities in fiber or in semiconductors can demultiplex the full stream only by demultiplexig each of the channels in parallel. To accomplish this, copies of the full input stream must be split off, one for each base rate channel, and sent to separate identical demultiplexers tuned for the individual channel.

SUMMARY OF THE INVENTION

The object of this invention is to provide a device to convert optically transmitted data at very high data rates (e.g., 100 Gbit/s or more) down to slower rates (e.g., 10–15 Gbit/s), which can be readily handled by currently available electronic circuitry.

Another object of this invention is to provide a device that utilizes only electronic power and control signals; requires no local optical clock or optical power, and in which the latency is short.

These and other objects are obtained by a demultuplexer consisting of a sequential division of the data stream in a series of Sagnac interferometer amplitude modulators (SIAMs), wherein each modulator in the series is driven by a single microwave frequency derived directly from a radio frequency (RF) data rate clock, with the RF phase properly adjusted to extract a channel of interest.

DETAILED DESCRIPTION OF THE PREFERRED EMBODIMENT

Figure 1:
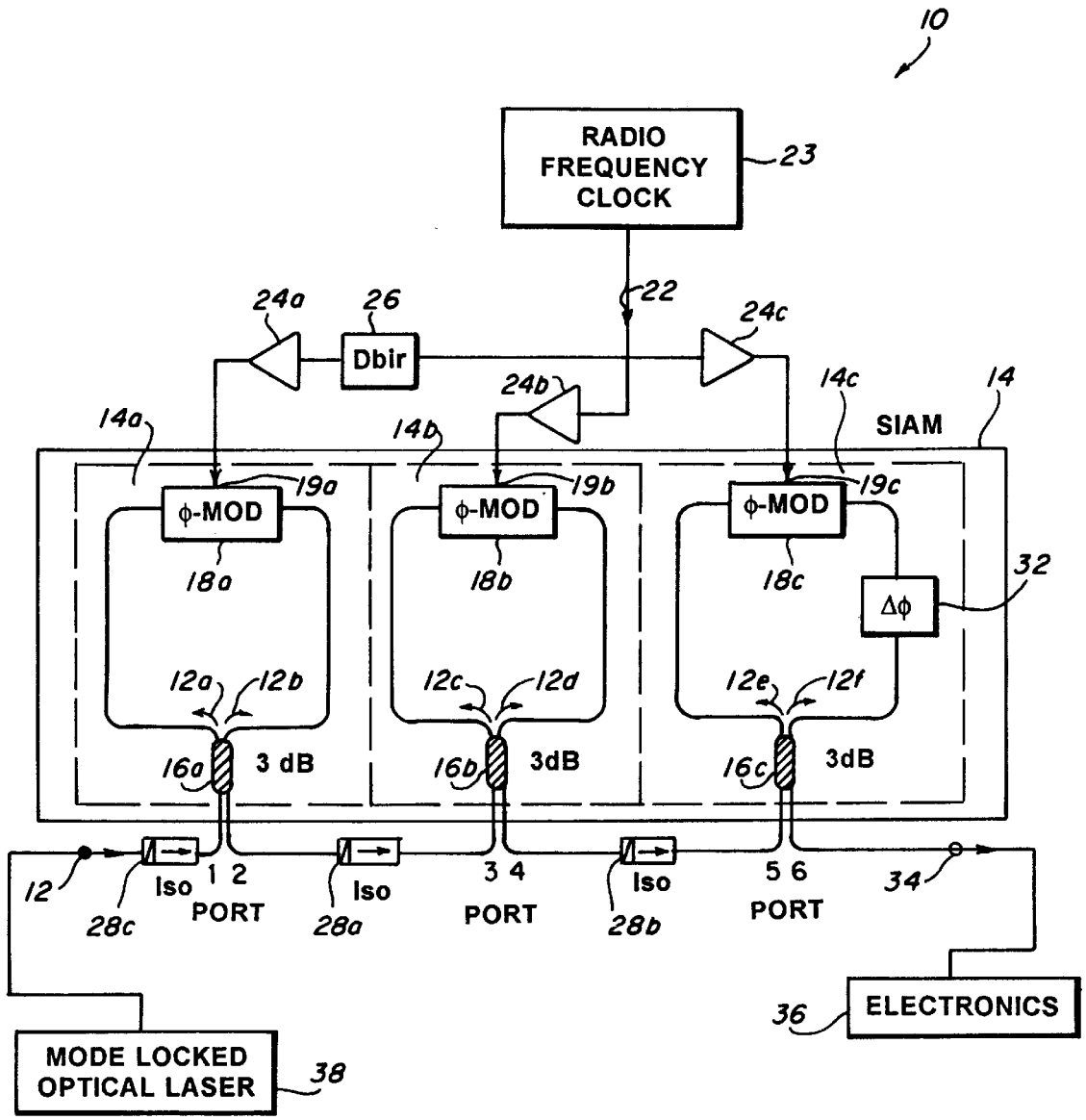
FIG. 1 shows a preferred embodiment of a demultiplexer (DMUX) having a capability of demultiplexing a single channel using a Sagnac interferometer amplitude modulator (SIAM) based demultiplexer.

The Saganac interferometer amplitude modulator (SIAM) based demultiplexer 10 for high-speed return-to-zero format optical time division multiplexed data, a single channel preferred embodiment, of which is shown in FIG. 1, consists of sequential division of an optical light 12 with a 100 Gbit/s data stream superimposed thereon, input to a series of Sagnac interferometer amplitude modulators 14a, 14b, and 14c through 3 dB optical couplers 16a, 16b, and 16c.

Each SIAM 14a, 14b, and 14c of the SIAM 14 chain consists of a traveling wave phase modulator 18a, 18b, and 18c, respectively, (e.g., fabricated as an integrated optic modulator in LiNbO$_3$) inserted into (optimally at the midpoint of) a fiber Sagnac interferometer structure driven by a single microwave radio frequency signal 22 at 12.5 GHz derived directly from a radio frequency (RF) data rate clock 23. The optical light 12, with the 100 Gbit/s data stream superimposed thereon, is input to port 1 of the first SIAM 14a, of the series of SIAMs 14 where the coupler 16a divides the light 12 into two equal parts which are applied equally to the two arms of the interferometer. The microwave radio frequency signal 22 of 12.5 GHz from the RF signal 22 is doubled to 25 GHz in a doubler 24 and amplified by an amplifier 26 and applied to the traveling wave electrode structure 19 of the modulator 18a of the first stage SIAM 14a at an amplitude of $\approx 2\ V_\pi$, where $V_{90}$ is the voltage swing required to switch the interferometer from the OFF to the ON state. Here the light 12a output from the coupler 16a is strongly modulated in the underlying optical waveguide propagating in the same direction as the microwave radio frequency (RF) signal 22, but only very weakly modulates the counterpropagating light 12b. When the oppositely propagating optical fields 12a and 12b arrive back at the input/output coupler 16a, they interfere according to the applied RF signal 22, yielding an intensity modulation which is output from port 2 of SIAM 14a at a data stream rate of 50 Gbit/s, one half the input data rate of 100 Gbit/s, to port 3 of the second stage SIAM 14b. In the second stage SIAM 14b, the light 12, having the 50 Gbit/s data stream superimposed thereon, is evenly divided, 12c and 12d, and travels through the modulator 18b the same as in the first stage SIAM 14a. The application of the 12.5 GHz signal 22 in the second stage 14b differs from that of 25 GHz applied to the first stage 14a. In the stage two SIAM 14b, the radio frequency signal 22 is amplified and applied to the modulators 18b traveling wave electrode structure 19 at an amplitude of $2V_\pi$. The data stream is output through port 4 of the SIAM 14b at a data bit rate of 25 Gbit/s to port 5 of the third stage SIAM 14c. The retroreflected portion of the light from stage two of the SIAM 14b is isolated from SIAM 14a stage one by an isolator 28a.

In stage three SIAM 14c, as in the preceding stages, the input 25 Gbit/s data stream is divided by a coupler 16c and a light path 12e containing 12.5 Gbit/s is applied to the modulator 18c where it is acted upon by the amplified 12.5 GHz RF signal 22 having an amplitude voltage of $V_\pi$, the retroreflected light being isolated from the SIAM 14b in stage two by an isolator 28b. The optical phase is biased in the SIAM 14c third stage utilizing a Faraday active optical bias element (See, U.S. patent application Ser. No. 08/690, 135, filed Jul. 31, 1996, entitled INTEGRATED OPTIC AMPLITUDE MODULATOR BASED ON THE SAGNAC INTERFEROMETER.) This is a Faraday active device that imposes a constant nonreciprocal phase difference, i.e., a bias phase, between the counterpropagating fields. The data channel of interest is output through port 6 as an output data steam 34 with a rate of 12.5 Gbit/s and applied to a receiver 36 to be converted to an electronics domain.

Figure 2:
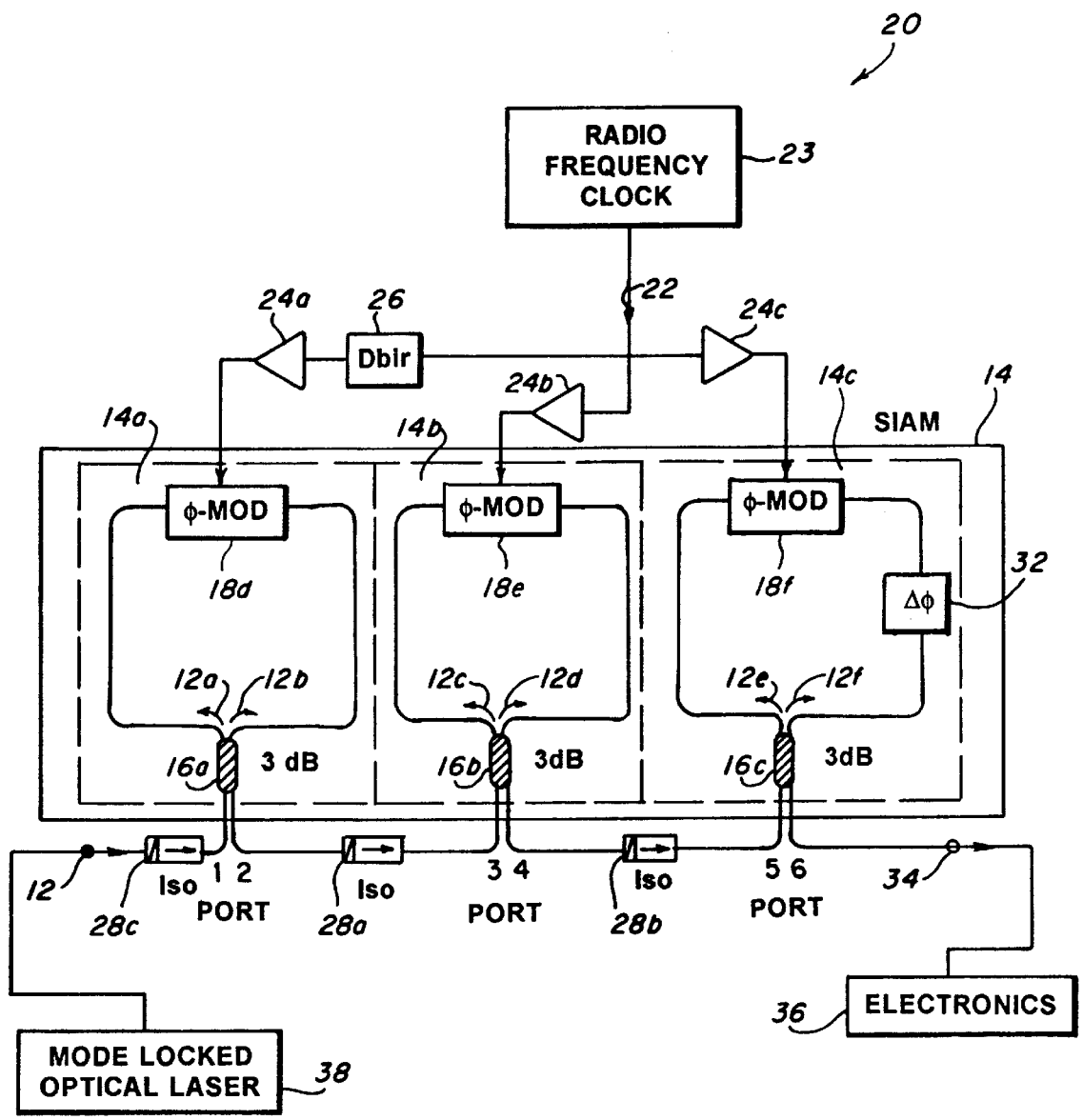
FIG. 2 shows a preferred embodiment of a demultiplexer wherein a modulator in the Sagnac interferometer is offset and without a traveling wave electrode structure.

In another preferred embodiment, shown in FIG. 2, the modulators 18d–f in the demultiplexer 20 are so-called "lumped element" modulators—i.e., a modulator 18d–f without a traveling wave electrode structure. In that event, the necessary differential phase modulation is effected by arranging for the oppositely propagating optical fields 12a and 12b to arrive at the modulators 18d–f at different phases of the RF drive signal 22. This can be accomplished by offsetting the position of each modulator 18d–f from the midpoint of its fiber interferometer 14a–c, optimally by a distance such that the propagation time from the interferometer midpoint to the modulator midpoint is equal to one quarter of the oscillation period of the applied RF signal for each. The applied RF frequencies and amplitudes are as specified above for the embodiment shown in FIG. 1, with equivalent effects and consequences. The effect of offsetting each modulator 18d–f from the midpoint of the interferometers 14a–c is to generate a differential phase modulation due to the differing voltages applied to the modulators 18d–f at the different arrival times of the oppositely propagating optical fields. This differential phase is then converted to amplitude modulation when the fields are interfered at the couplers 16a–c, as in the embodiment shown in FIG. 1.

Figure 3A:
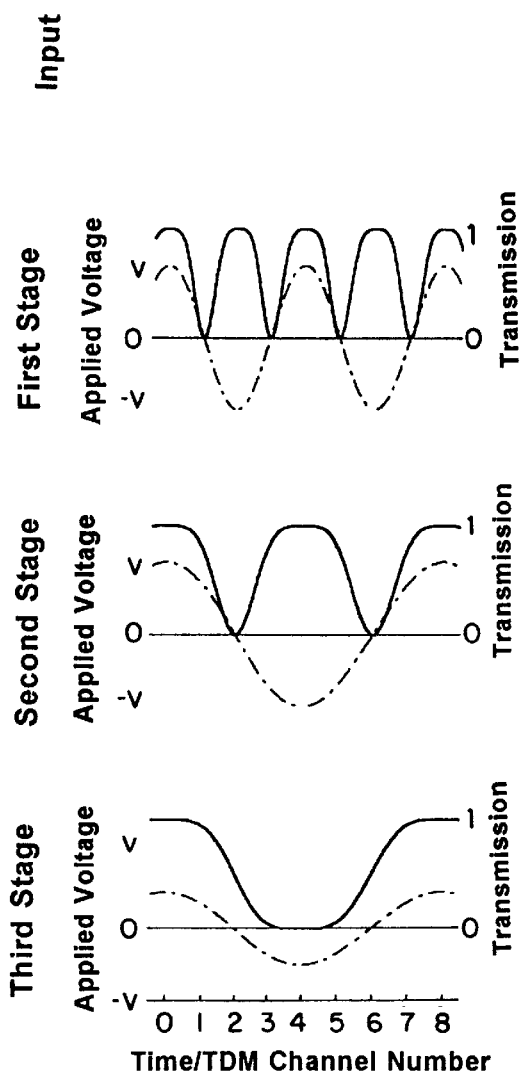
FIG. 3a shows the initial data stream of eight channels at a data rate of $\Omega/2\pi$ which are interleaved equally spaced in time that is launched into the demodulator (DMUX) input.
Figure 3A:
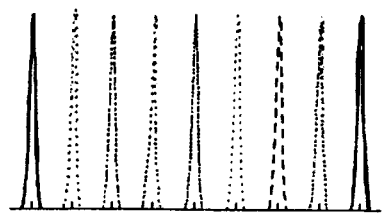
Figure 3B:
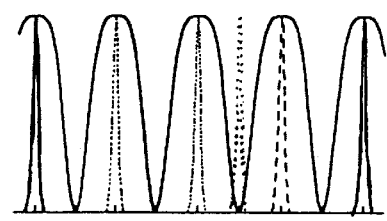
FIG. 3b shows the unbiased first stage pulses of the demodulator.

As previously noted, the demultiplexer 10 consists of three SIAMs 14a, 14b, and 14c arranged in series, these are driven so that their respective transmission functions multiply so as to transmit only every eighth pulse—that is, all of the pulses in a single channel of an eight-fold multiplexed TDM stream—while blocking the pulses from all other channels. This is accomplished by sequentially blocking every other pulse in the stream input to each modulator 18a–c in the chain, as shown in FIGS. 3a–d. The initial data stream consists of eight channels at a data rate of $\Omega/2\pi$, which are interleaved equally spaced in time, as shown in FIG. 3a; this data bit stream 12 is launched into the demodulator (DMUX) input. A sinusoidal voltage at an angular frequency $2\Omega$ of amplitude $2V_\pi$ is applied to the phase modulator. As the interferometric transmission characteristic is sinusoidal with voltage, applying a sinusoidal voltage swings the modulator 18a–c from ON, through OFF, to ON again, and so on. For an unbiased (i.e., 0° bias) first stage 14a, as shown in FIG. 1, the modulator transmission function is $$T_1 = \tfrac{1}{2} - \tfrac{1}{2} \cos[\pi \sin(2\Omega t + \pi/2)] \quad (1)$$

so that it will transmit every other pulse, as shown in FIG. 3b. In effect, the input data bit stream 12 has been divided into two streams (one transmitted 12a, the other 12b retroreflected to the input) at half the input stream data rate (each at $4\Omega$).

Figure 3C:
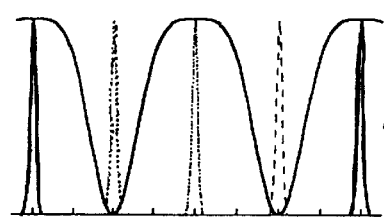
FIG. 3c shows the second stage transmission function of the demultiplexer transmitting every other pulse to produce two data streams at $2\Omega$.

The second stage 14b is likewise unbiased and driven at $2V_{90}$, but at a frequency $\Omega$, equal to the data rate. Thus, the second stage 14b transmission function is $$T_2 = \tfrac{1}{2} - \tfrac{1}{2} \cos[\pi \sin(\Omega t + \pi/2)], \quad (2)$$

again transmitting every other pulse to produce two data streams at $2\Omega$, half the input rate to this stage), as shown in FIG. 3c.

Figure 3D:
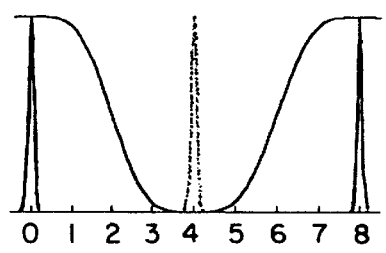
FIG. 3d shows the third and final stage biased at quadrature so that the applied RF at $\Omega$ with amplitude $V_\pi$ alternately switchs every other pulse to the output port.

The third and final stage 14c is biased at quadrature—halfway between fully OFF and fully ON—so that an applied RF at $\Omega$ with amplitude $V_\pi$ will again alternately switch every other pulse to the output port 6 of stage 14c:

$$T_3 = \tfrac{1}{2} + \tfrac{1}{2} \cos[\pi/2 \sin(\Omega t - \pi/2) + \pi/2], \quad (3)$$

as shown in FIG. 3d.

The final transfer function is the product of the transmission profiles of the three modulators 18a–c:

$$T = T_1 \cdot T_2 \cdot T_3, \quad (4)$$

which is readily calculated from Eqs. 1–3.

Figure 4:
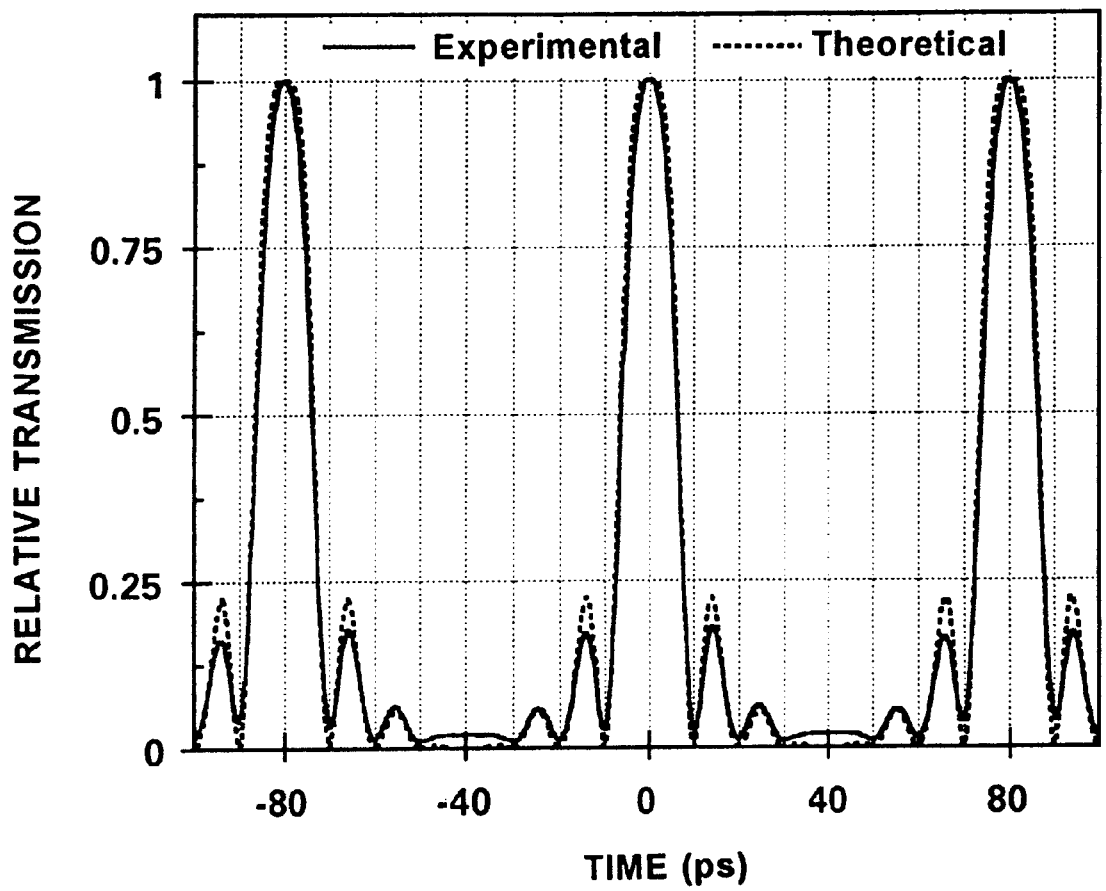
FIG. 4 shows the experimentally measured transfer function and compares it with the theoretically expected function.

In an experimental model, the transfer function has been measured using an optical sampling technique for a single channel in the configuration shown in FIG. 1. An optical pulse stream 12 from a mode locked fiber laser 38 (~1.5 ps pulsewidth, at a repetition rate of ~12.5 GHz) was launched into the demultiplexer input port 1, while the DMUX 10 was driven at a frequency slightly offset from the rate of the pulse stream 12. Due to the differing frequencies, the relative timing of the pulse walks across the DMUX 10 transmission function at a rate equal to the difference between the drive frequencies. The very short pulses in effect sample the transmission as a function of relative delay, mapping out the full transmission profile as the slowly varying power output by the DMUX. The experimentally measured transfer function is shown in FIG. 4, and compared with the theoretically expected function from Eq. 4. It is noted that the two functions closely compare.

Figure 5A:
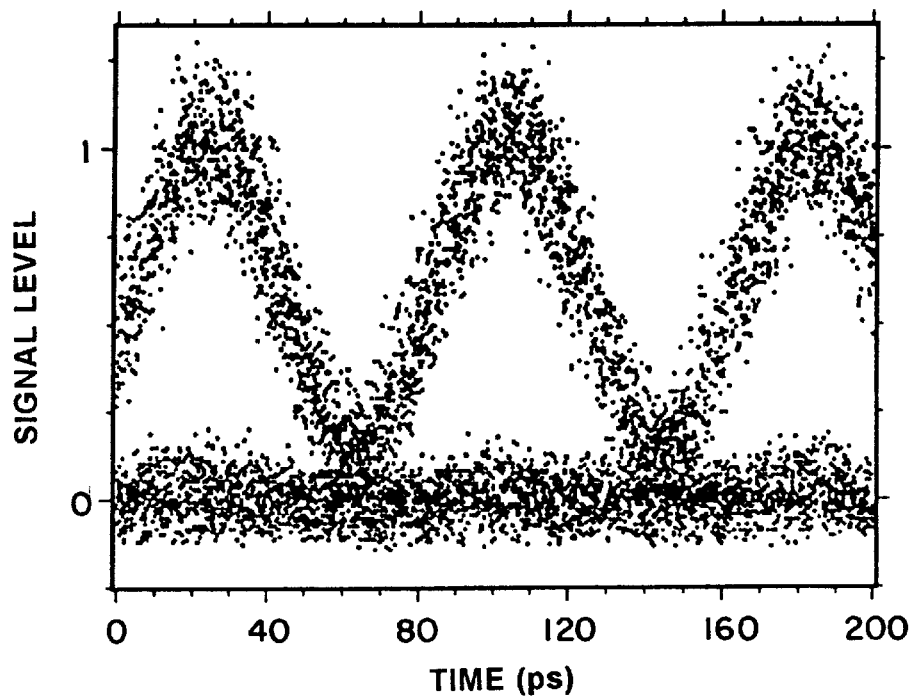
FIG. 5a shows an eye pattern developed from the experimental model.
Figure 5B:
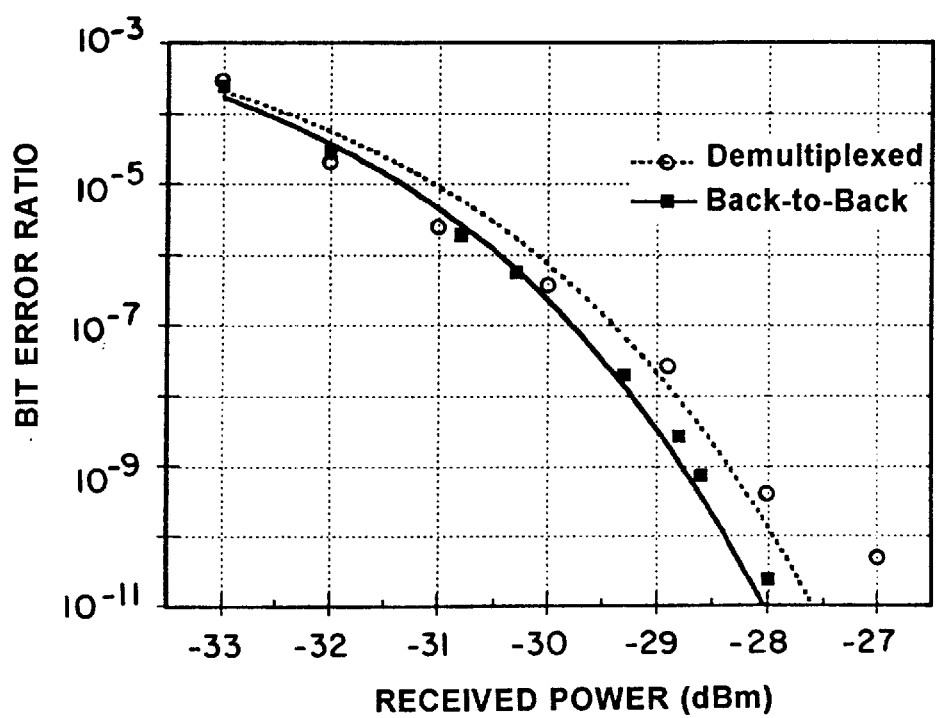
FIG. 5b shows a comparison of the bit error ratio (BER) of the demultiplexed data with that of the original data stream.

In the experimental model, to demonstrate the multiplexing fidelity of the system, a 100 Gbit/s data bit stream consisting of eight identical multiplexed channels at 12.5 Gbit/sec was launched into the demultiplexer 10. The DMUX 10 was driven by the original system clock 23 (i.e., the source used to generate the original 12.5 Gbit/s data), and the delay was adjusted to demultiplex a single channel. The demultiplexed data were sent to a preamplified receiver (not shown), then to an error detector (not shown) for comparison with the originally transmitted data and measurement of the bit error ratio. The fidelity of the demultiplexed data is shown on FIG. 5a and b. FIG. 5a shows the eye pattern, the opening is broad and clear, indicating good transmission of the data. FIG. 5b compares the bit error ratio (BER) of the demultiplexed data 34 with that of the original data stream 12. The effectiveness of the DMUX 10 is illustrated by the low power penalty(<0.5 dB) incurred in the demultiplexing.

Figure 6:
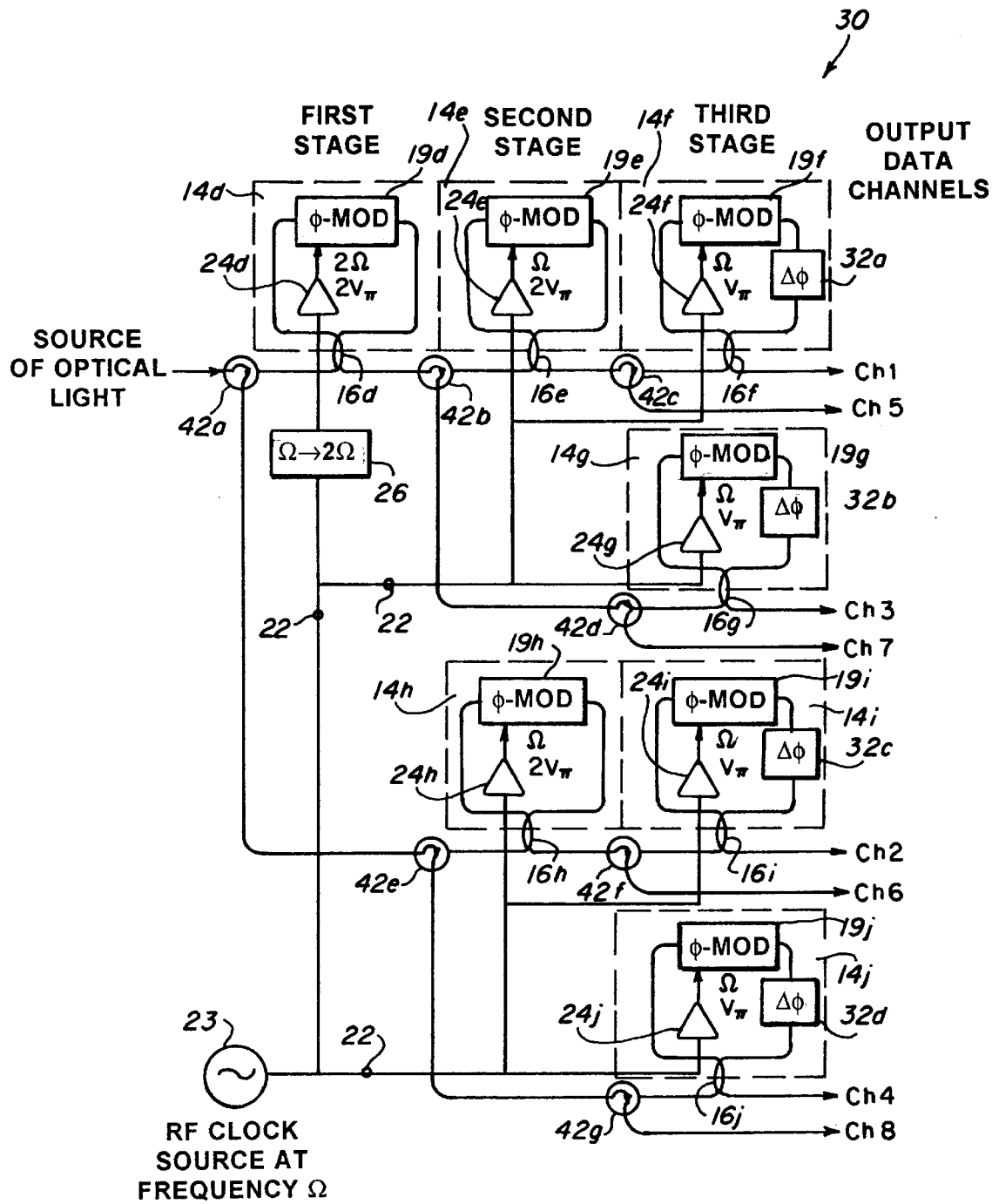
FIG. 6 shows a preferred embodiment of the demultiplexer to demultiplex a fill data stream having multiple channels.

In another preferred embodiment, FIG. 6, this invention may readily demultiplex all of the eight channels from a single input data stream 12 by taking advantage of a sequential clock division method of demultiplexing, so that the full data stream 12 may be multiplexed by adding additional modulators 18 in a tree configuration, rather than adding an additional modulator chain 14 for each channel, as required by the prior art. Thus, for demultiplexing an eight channel TDM stream, three modulators, as exemplified by reference numbers 19a–c, are required for a single channel, but only four additional modulators 19 are required to implement the full MUX (as opposed to three per channel.) The described preferred embodiment has been limited here to eight-fold multiplexing in a three-modulator sequence, in general $2^n$ channels may be demultiplexed with n modulators in series. For example, four-fold and sixteen-fold DMUX can be implemented with a sequence of two and four modulators, respectively, and of course two-fold demultiplexing can be performed with only a single modulator.

To demultiplex the full data stream 12, as shown in FIG. 6, the demultiplexer 30 consists of a tree configuration, and the isolators 28a–b found in the embodiment shown in FIG. 1 between successive stages must be replaced by circulators 42a–g. The function of the circulators 36 is to provide access to those channels in the input data stream 12 that are reflected by each SIAM 14d–j; these are either branched to another modulator 14d–j for further demultiplexing, or, in the case of the final stage 14f, 14g, 14i, and 14j, constitute an output channel. In this embodiment, the chains are set so that the channels associated with a stage are as shown in Table 1. The amplitudes and frequencies of the RF drive signals to each modulator 19d–j are as indicated in FIG. 6.

TABLE 1

INTERFEROMETERS FORMING EACH CHAIN OF DEMULTIPLEXERS

| Output Channel | First Interferometer | Second Interferometer | Third Interferometer |
|---|---|---|---|
| 1 | 14d | 14e | 14f |
| 2 | 14d | 14h | 14i |
| 3 | 14d | 14e | 14g |
| 4 | 14d | 14h | 14j |
| 5 | 14d | 14e | 14f |
| 6 | 14d | 14h | 14i |
| 7 | 14d | 14e | 14g |
| 8 | 14d | 14h | 14j |

As previously noted, operation of the tree configuration to demodulate eight channels is basically the same as that previously described with respect to the single channel demodulation with the exception of the addition of circulators 42a–g in place of the isolators 28a–b.

Figure 7:
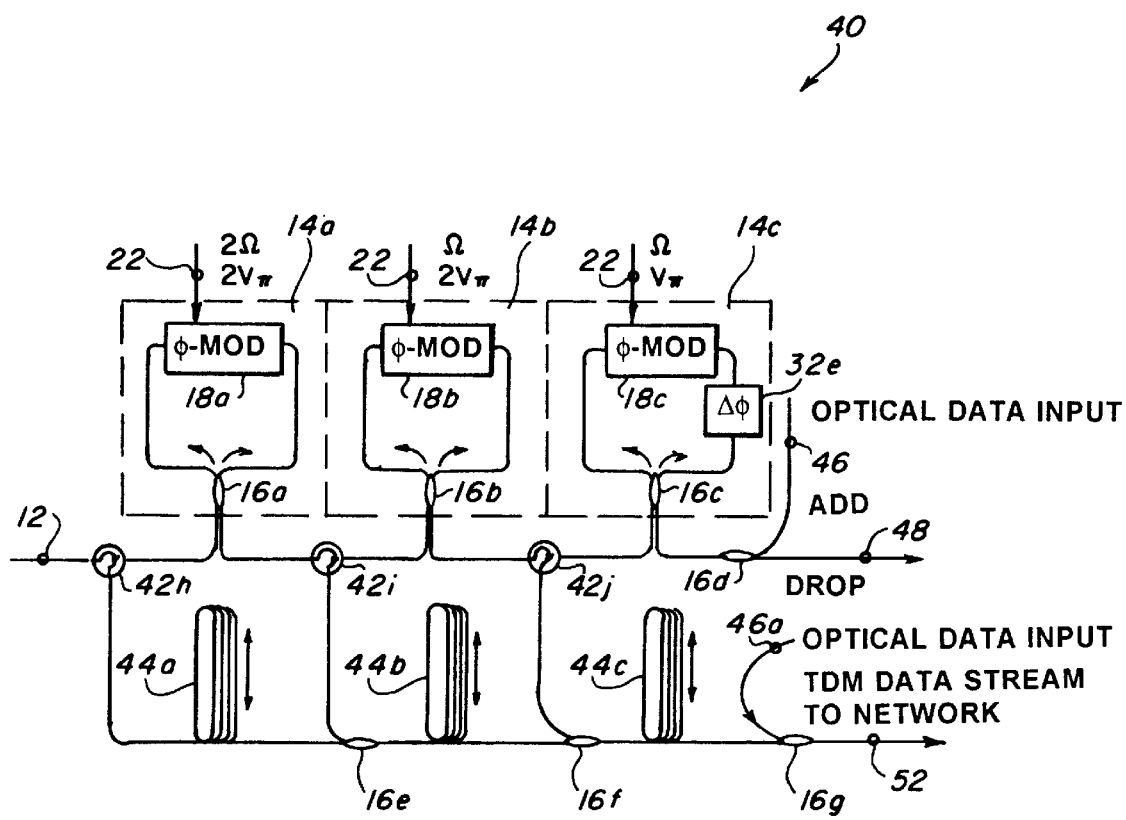
FIG. 7 shows the preferred embodiment of the demultiplexer means for implementing the ADD/DROP node using the single branch SIAM DMUX.

The basic concept may be extended to construct an ADD/DROP demultiplexer, an important component for time division multiple access (TDMA) network schemes. All of these alternative embodiments share the common fundamental feature of sequential, clock division demultiplexing using Sagnac interferometer modulators. In another preferred embodiment, as shown in FIG. 7, the means for implementing an ADD/DROP node using the single branch SIAM DMUX is shown. The chain and its operation is a basic single channel demultiplexer, the same as that shown in FIG. 1, to remove a channel from the data stream at the destination node, in combination with a series of optical fiber delay lines for the reconstructing the data stream and inserting locally generated data into an empty channel. The function of the ADD/DROP node is to allow the user to extract the channel of interest from the data stream and direct all the remaining channels in the data stream to the next node in a network. Circulators 42h–j are used in place of the isolators to prevent the retroreflected optical light from interfering with the previous stage, and direct the retroreflected light back into the data stream. The dropped channel is then available for transmission of the local node's data, which is added to the data stream either through an additional coupler or through the output port of the final stage SIAM of the DMUX. To reconstruct the input data stream, without the demultiplexed channel, the retroreflected channels from the sequentially divided data streams from SIAMs 14a–c are reassembled with appropriate delays by the use of variable delay devices 44a–b and directed to the next node as an output data stream 52. The local node may optionally insert data 46 and 46a into any empty channel using coupler 16g, by appropriately setting variable delay 44c. The data output 48 of the channel of interest is output to a using device after being coupled with other data of interest from a local node in coupler 16d. Simply, the channels rejected by each stage of the DMUX are recombined using fiber optic couplers 16d–e with the appropriate delays. The appropriate delays are provided by the variable delay device 44a–c, which may be of any type known to those skilled in the art, in this instance delay devices made by mechanical fiber stretching techniques were used.

Although it is to be noted that FIG. 7 is quite simplistic, a fully functional implementation would require that some logic operations be performed on the demultiplexed data to determine whether it is in fact destined for the receive node or for some other node operating on the same channel. In the latter case, the received data would need to be returned to the data stream, and no data could be transmitted by the receive node. Also, the total insertion losses seen by the several channels to be returned to the network would need to be equalized as they are recombined.

Figure 8:
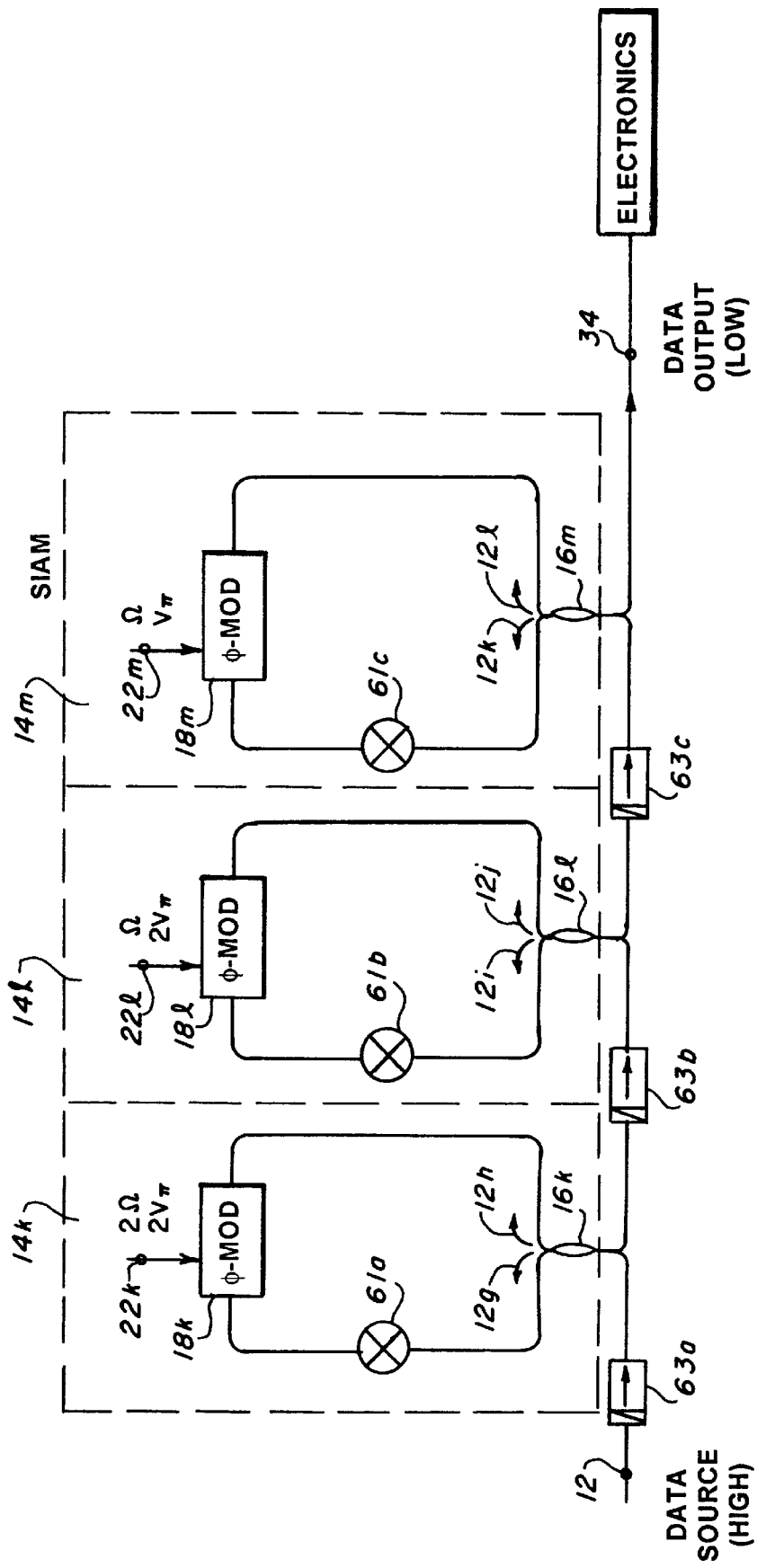
FIG. 8 shows a preferred embodiment that is polarization independent.

In the practical TDM network or communications link, the polarization state of the optical carrier upon arrival at the demultuplexers 10, 20, 30, and 40 shown in FIGS. 1, 2, 6, and 7, respectively, may be arbitrary and unknown. Thus it would be desirable to have a demultiplexer which is polarization independent, i.e., a device which separates the channels of interest regardless of their input polarization state. The foregoing embodiments may in priciple be made polarization independent if the phase modulators, as exemplified by reference numbers 14a–c, are made to be polarization independent. Modulators based on lithium niobate (and designed for optimum modulation) are intrinsically polarization dependent due to the large difference between the relevant electro-optic coefficients (normalr $r_{33}$ and $r_{13}$). It has recently been shown, however, that the Sagnac interferometer may be made polarization independent by arranging for the corresponding polarization components of the counterpropagating optical fields to be modulated on opposite birefringent axes of the modulator. The net modulation is then proportional to the electro-optic birefringence in the modulator. This preferred embodiment 50 may be implemented in the SIAM schemes described above by incorporating the methods shown in Fang et al., A DC TO MULTIGIGABIT/S POLARIZATION-INDEPENDENT MODULATOR BASED ON THE SAGNAC INTERFEROMETER, J. Lightwave Commun., Vol. 15, No. 11, pp. 2166–2171, Nov. 1997, as shown in FIG. 8. For devices utilizing a polarization maintaining fiber (PMF) Sagnac interferometers, the scheme can be simply implemented by inserting a 90° ("cross") splice 61a–c at some point in the loop. A cross splice being one for which the slow axes of each polarization maintaining fiber is aligned to the fast axis of the other. Though LiNbO$_3$ modulators 18k–m are exemplary for purposes of this discussion, the scheme is likewise effective for electro-optic modulators 18k–m made from other birefringent materials with differing electro-optic coefficients on the principle axes, e.g., lithium tantalate (LiTaO$_3$).

Any of the previously described embodiments may be implemented as a polarization independent device. FIG. 8 being analogous to FIG. 1, is exemplary of the basic single channel DMUX building block constructed for polarization independent operation using polarization maintaining fiber. Lithium niobate phase modulators 18k–m, being analogous to modulators 18a–c, with polarization maintaining fiber pigtails aligned to the birefringence axes of the modulator substrate, are driven by microwave frequency electrical signals 22k–m at frequencies and net amplitudes as described in the demultiplexer 10 of FIG. 1. Light input to each stage of the PMF couplers 16k–m is divided into two counterpropagating (clockwise and counterclockwise) optical fields 12g–l. The counterclockwise propagating fields 12g–l propagate to the modulators 18k–m with the light split along the birefringence axes of the PMF, and thus the principal axes of the modulators 18k–m, according to the input state of polarization. The polarization of the clockwise propagating optical fields 12g, i, and k are initially split along the PMF in the same manner as for the fields 12h, j, and l, but the axes are exchanged at the cross splices 61a–c, before propagating on to the modulators 18k–m. Thus, the corresponding components of the clockwise 12g, i, and k and counterclockwise 12h, j, and l fields propagate through the modulators 18k–m on orthogonal axes. After passing through the modulators 18k–m, the polarization axes of the counterclockwise fields 12h, j, and l are also reversed at the cross splices 61a–c. When the counterpropagating fields 12h–l arrive back at the couplers 16k–m they interfere according to the differential optical path length between the two polarization axes of the modulators 18k–m, that is, according to its birefringence. The applied microwave frequency electrical signal 22k–m modulates this birefringence due to the difference between the primary electro-optic coefficients, yielding intensity modulation and demultiplexing the same as for that described in demultiplexer 10 of FIG. 1. Note that the bias unit 32 of FIG. 1 has been omitted from the final stage of demultiplexer 50 of FIG. 8. This is due to the fact that the bias birefringence of the modulators 18k–m may be varied with an applied DC voltage, so that no nonreciprocal element is necessary.

The elements 63a–c may be isolators such as 28a–c shown in FIGS. 1 and 2, to prevent the back reflections from each stage 14k–m from interfering with the operation of the previous stage, or they may be circulators, as shown at 42a–j of FIGS. 6 and 7, to either demultiplex the remaining data channels in additional DMUX stages or to return the data stream to a network through appropriate delay lines.

In order to preserve polarization independent operation using this scheme, care must be taken to ensure that the oppositely propagating fields 12g, i, and k and 12h, j, and l see identical modulations of the birefringence. In an implementation using traveling wave electrodes, similar to that shown in FIG. 1 at reference numbers 19a–c, this requires that the input electrical signal 22k–m be divided equally and the two resulting signals propagated down the electrode structure in opposite directions. In an implementation using lumped element phase modulators, as shown in reference numbers 18d–f, of FIG. 2, would require the modulators be located at the midpoints of the interferometers. (It is also possible to combine the offset and traveling wave schemes by properly phase shifting one of the two electrical signals so as to compensate for the offset.)

An additional consideration for demultiplexing of return-to-zero encoding data using short carrier pulses is that the net polarization mode dispersion (the differential time delay for light which has propagated along the two possible polarization axes), i.e., the total birefringence, must be much less than the duration of the carrier pulse. If this is not the case, the pulses corresponding to the two paths, as exemplified by reference numbers 12a–f in FIG. 1, arrive back at couplers 16a–c at different times and do not interfere. The net polarization mode dispersion may be minimized by orienting the modulator 18a–c pigtail fiber axes and coupler 16a–c fiber axes to compensate the (typically much larger) birefringence of the modulator substrate. That is, the fiber orientations are arranged so that light which propagates through the modulators 18a–c on the slow axes will propagate through the interferometers 14a–c mostly on the fast axis of the PMF, and vice versa, and the total length of the PMF will be chosen to compensate the modulator 18a–c birefringence, ideally yielding negligible path length difference for the two possible input polarizations.

While the foregoing discussion specifically discusses polarization independent demultiplexers using polarization maintaining fibers interferometers, any of the methods taught may be implemented using standard fiber (that is, non-PM) interferometers. In that case, however, a means of properly orienting the polarization states of the input counterpropagating optical fields to the modulation axes of the phase modulators would be required. A variety of such polarization controllers are well known to those skilled in the art. However, such a standard fiber based demultiplexer is susceptible to variations in the birefringence of the interferometer fiber, as may be induced by changes in temperature or mechanical perturbation. This limits the long-term stability and thus the general applicability of the device vis-a - vis the PMF embodiments.

For the invention, the sequence of RF drive amplitudes and frequencies are not unique, rather the particular arrangement is chosen for convenience given the restraints of present day state of the art in RF power amplifier and low drive voltage modulator technology. The only requirement is that each successive pulse in the TDM data stream be switched to alternate ports of the Sagnac interferometer modulators. The bias and amplitude settings that have been described above—0° interferometer bias with $2V_{90}$ drive and quadrature (90°) bias with $V_{90}$ drive—are the preferred, but they may be combined in a variety of ways. In particular, the quadrature-bias/$V_{90}$-drive case yields the most nearly ideal transmission characteristic, with relatively flat minima and maxima which are thus less sensitive to variations in the drive amplitude. Eight-fold DMUX can then be effected by driving the successive stages at frequencies of $4\Omega$, $2\Omega$, and $\Omega$. The first-second-third stage modulations in the (bias angle, drive amplitude, drive frequency) sequence of (0°, $2V_{90}$, $2\Omega$)–(90°, $V_\pi$, $2\Omega$)–(90°, $V_{90}$, $\Omega$) would likewise be effective, as would a variety of other similar combinations. Also note that for demultiplexing a single channel, those modulators which are zero-biased and used in transmission need not be driven to the full $2V_\pi$, as the important operating parameter is the suppression of the unwanted channel, rather than the full transmission of the channel of interest. In the experimental model, the first stage could only be driven to $\sim 1.7V_\pi$ due to limitations of the available RF amplifiers at the 25 Ghz drive frequency.

A variation of this theme can be implemented to obtain sequential effective three-to-one demultiplexing from TDM streams consisting of $3^n$ multiplexed channels. This is accomplished using a 0° bias with a drive amplitude of 2.309 $V_{90}$ {2.309=2/sin(60°)] at a frequency of 1.5 $\Omega$. Demultiplexing the full data stream in such a situation is, however, significantly more complex than in the $2^n$ case. Appropriate combinations of drive amplitudes, phases, and frequencies, can be derived for any number of channels whose only prime factors are 2 and 3.

This invention offers six key advantages over previously demonstrated high speed demultiplexer configurations: (1) It operates electro-optically, and therefore requires no optical clock signal; (2) the demultiplexing system is relatively compact, so that the propagation latency is small; (3) the sequential demultiplexing scheme allows full stream demultiplexing via straightforward expansion of the system; (4) it utilizes Sagnac interferometer amplitude modulators, which have intrinsically higher extinction than standard Mach-Zehnder modulators; (5) the SIAM 14 is inherently bias stable, thereby eliminating feedback bias control; and (6) polarization independent demultiplexing may be simply implemented, albeit by sacrificing advantage (5).

Advantages (4) and (5) stem from the unique properties of the SIAM 14 configuration, compared with alternative modulators, and these advantages are especially important for demultiplexing very high speed TDM streams. In the SIAM 14, a single coupler 16 is used as both input and output coupler, so that an error from 50% is partially canceled. The coupler 16 is an all-fiber device, for which the fabrication tolerances are typically much tighter (i.e., yielding ON/OFF extinction ratios of ~30 dB.)

The problem of bias drift is eliminated by the use of the SIAM 14 configuration. The two arms of the Sagnac interferometer (i.e., the opposite propagation directions around the loop) are physically identical in the polarization dependent embodiment, so that there is no optical path length difference other than that induced by the applied modulation. Thus, while a modulator based demultiplexer analogous to the invention can certainly be constructed from Mach-Zehnder modulators, the SIAM 14 configuration is intrinsically simpler and more stable. For situations requiring a specific non-zero bias, such as the quadrature biased final stage of the DMUX, a drift-free, static nonreciprocal element may be used.

The possibility of polarization independent operation with a minor modification (i.e., an additional cross splice) of the basic SIAM configuration is a unique feature of the SIAM DMUX, and satisfies a major requirement for implementation of a practical high speed TDM network.

This invention serves to convert optically transmitted serial data at very high data rates (100 Gbit/s or more) down to slower parallel rates (e.g., 10–15 Gbit/s), which can be readily handled by currently available electronic circuitry. As such, this invention fills an important requirement for next generation high speed optical communications links and networks. This invention offers important advantages over previously demonstrated alternative schemes, in that it requires only electronic power and control signals; in that it requires no local optical clock or optical power, and in that the latency (propagation time of the input light through the device) is short.

However, to achieve these advantages, there are restrictions that are placed on the use of this technique. The invention is uniquely adaptable to TDM data streams composed of $2^n$, $3^n$, and multiples of $2^n \times 3^n$ channels; the scheme does not work conveniently for other rates Another restriction is that the encoding scheme needs to be return to zero (RTZ) rather than a non-return to zero (NRZ) scheme. A third restriction of minor importance is that the pulse should be relatively short with relation to the bit period (e.g., less than ~20% of the period.).

Although the invention has been described in relation to the exemplary embodiments thereof, it will be understood by those skilled in the art that other variations and modifications can be affected in the preferred embodiments without detracting from the scope of the invention as set forth in the claims.

What is claimed:

1. An optical demultiplexer for demultiplexing an optical signal containing a plurality of optical channels with a high-speed data stream superimposed thereon into a preselected optical channel with a low-speed data stream comprised of:

means for phase modulating an input optical data stream in a series of Sagnac interferometers with a microwave radio frequency signal at a predetermined frequency and power so that the output optical data stream rate is one-half the input data stream rate for each interferometer of the series of interferometers; and means for converting the output optical data stream to an electronic domain.

2. An optical demultiplexer for demultiplexing an optical signal containing a plurality of optical channels with a high-speed data stream superimposed thereon into a preselected optical channel with a low-speed data stream comprised of:

means for applying an optical signal with the high-speed data stream superimposed thereon;

a plurality of Sagnac interferometers in cascade, a first Sagnac interferometer of the cascade receiving the optical signal with the high-speed data stream superimposed thereon;

a microwave radio frequency signal, having a preselected power level and frequency, applied to each interferometer for phase modulating a higher-speed data stream and providing an output data stream rate from each interferometer one-half the speed of the input data stream rate;

means for preventing a retroreflected optical light from each interferometer from interfering with the input optical data stream;

means for adjusting the bias phase of the output of a last interferometer in the cascade; and a last interferometer of the cascade of interferometers outputting an optical signal with a low-speed data stream superimposed thereon which is applied to a receiver for conversion to the electronic domain.

3. A demultiplexer, as in claim 2, wherein the means for preventing a retroreflected optical light from each interferometer from interfering with the input optical data stream is an optical isolator.

4. A demultilexer, as in claim 2, wherein the means for adjusting the bias phase of the output of a last interferometer in the cascade is an Faraday active device.

5. An optical demultiplexer for demultiplexing an optical signal containing a plurality of optical channels with a high-speed data stream superimposed thereon into a preselected optical channel with a low-speed data stream comprised of:

means for applying an optical signal with the high-speed data stream superimposed thereon;

a plurality of Sagnac interferometers, in cascade, each interferometer further comprised of a phase modulator, having a traveling wave electrode structure;

a microwave radio frequency signal at a preselected power level and frequency applied to each modulator for phase modulating a high-speed input data stream applied to each interferometer, in the cascade, providing an output data stream rate from each interferometer one-half of the input data rate which is applied in series to a succeeding interferometer in the cascade;

means for preventing a retroreflected optical light from each interferometer from interfering with the optical light in the preceding interferometer;

means for shifting the bias phase of the output of a last interferometer to quadrature; and a last interferometer of the cascade of interferometers outputting an optical signal with a low-speed data stream superimposed thereon which is applied to a receiver for conversion to the electronic domain.

6. An optical demultiplexer for demultiplexing an optical signal containing a plurality of optical channels with a high-speed data stream superimposed thereon into a preselected optical channel with a low-speed data stream comprised of:

means for applying an optical light having the high-speed data stream superimposed thereon;

a plurality of Sagnac interferometers in cascade, said interferometers having a first and second optical path;

said first path being of a lesser length than said second path;

each interferometer further comprised of a phase modulator without a traveling wave electrode;

a microwave radio frequency signal at a preselected power level and frequency applied to each modulator of the cascade of Sagnac interferometers and providing an output data stream rate from each interferometer one-half of the input data rate which is applied in series to a succeeding interferometer in the cascade;

means for preventing a retroreflected optical light from each interferometer from interfering with the optical light in the preceding interferometer;

means for shifting bias phase of a last interferometer of the cascade to quadrature; and a last interferometer of the cascade of interferometers outputting an optical signal with the low-speed data stream superimposed thereon which is applied to a receiver for conversion to the electronic domain.

7. An optical demultiplexer for demultiplexing an optical data channel comprised of:

a plurality of Sagnac interferometers, each interferometer further comprised of a phase modulator for modulating an optical light signal when an external modulation signal is applied;

an optical data steam at a high speed received from a preceding network node is input to a first Sagnac interferometer wherein it is divided into a first and second data stream;

a microwave radio frequency signal at a first preselected power level and frequency applied to said modulator for modulating said first data stream;

said modulated first data stream is output from the first Sagnac interferometer at one-half the input data rate and applied to a second Sagnac interferometer;

said first data bit stream applied to the second Sagnac interferometer is divided into a third and fourth data stream;

a microwave radio frequency signal at a second preselected power level and frequency applied to said second Sagnac interferometer modulator for modulating said third data stream;

said modulated third data stream is output from the second Sagnac interferometer at one-half the input data rate and applied to a third Sagnac interferometer;

said third data stream applied to the third Sagnac interferometer is divided into a fifth and sixth data stream;

said modulated fifth data stream is output from the third Sagnac interferometer at one-half the input data rate through an phase bias optical phase shifter to shift the optical signal to quadrature and applied to an electronic domain at a slow data rate.

8. An optical demultiplexer, for demultiplexing an optical signal having a plurality of channels of high-speed data streams superimposed thereon into a plurality of individual low-speed data stream channels, comprised of:

means for applying the optical signal;

a plurality of Sagnac interferometers arranged in a first through fourth demultiplexer in a tree formation;

a first, second and third interferometer forming the first demultiplexer cooperating together to produce a first and fifth low-speed data stream;

a first, fifth and sixth interferometer forming the third demultiplexer cooperating together to produce a second and sixth low-speed data stream;

a first, second and fourth interferometers forming the second demultiplexer cooperating together to produce a third and seventh low-speed data stream;

a first, fifth and seventh interferometer forming the fourth demultiplexer cooperating together to produce a fourth and eighth low-speed data channel;

each of the plurality of interferometers being further comprised of a phase modulator;

a microwave radio frequency signal at a preselected power level and frequency applied to each phase modulator for modulating a high-speed input data stream applied to each interferometer, in each demultiplexer, providing an output data stream rate from each interferometer one-half of the input data rate which is applied in series to a succeeding interferometer in each demultiplexer;

means for preventing a retroreflected optical light from each interferometer from interfering with the optical light in the preceding interferometer and directing a portion of said retroreflected light having an undemultiplexed channel superimposed thereon to a preselected next demultiplexer;

means for shifting bias phase of the output of a last interferometer to quadrature; and a last interferometer of each demultiplexer outputting an optical signal with a low-speed data stream superimposed thereon which is applied to a receiver for conversion to the electronic domain.

9. A delultiplexer, as shown in claim 8, wherein the means for preventing a retroreflected optical light from each interferometer from interfering with the optical light in the preceding interferometer and directing a portion of said retroreflected light having an undemultiplexed channel superimposed thereon to a preselected next demultiplexer is a circulator.

10. An optical demultiplexer for converting an optical channel containing a high-speed data stream into a low-speed data stream comprised of:

means for applying an optical signal with the high-speed data stream superimposed thereon;

a plurality of Sagnac interferometers, in cascade;

an optical signal with a high-speed data stream superimposed thereon applied to a first interferometer in the cascade of interferometers that separates into a clockwise and counterclockwise optical input upon entering the interferometer;

each interferometer further comprised of a phase modulator and a 90° cross splice reverse the polarization axes;

a microwave radio frequency signal at a preselected power level and frequency applied to each phase modulator for modulating a high-speed input data stream applied to each interferometer, in the cascade, providing an output data stream rate from each interferometer one-half of the input data rate which is applied in series to a succeeding interferometer in the cascade;

means for preventing a retroreflected optical light from each interferometer from interfering with the optical light in the preceding interferometer;

a last interferometer of the cascade of interferometers outputting an optical signal with a low-speed data stream superimposed thereon which is applied to a receiver for conversion to the electronic domain.

11. A demultiplexer, as in claim 10, further comprising a means for delaying the unused data stream redirected to another node.

12. A demultiplexer, as in claim 11, wherein the means for delaying the unused data stream redirected to another node is an optical delay line.

13. A demultiplexer, as in claim 11, wherein the means for directing unwanted data from the input data stream is an optical coupler.

14. An optical demultiplexer for demultiplexing an optical signal containing a plurality of optical channels with a high-speed data stream superimposed thereon into a preselected optical channel with a low-speed data stream comprised of:

a plurality of Sagnac interferometer in cascade, each interferometer further comprised of a phase modulator;

an optical signal with the high-speed data stream superimposed thereon applied to each interferometer in the cascade of interferometers that separates into a clockwise and counterclockwise optical input upon entering the interferometer;

a microwave radio frequency signal at a preselected power level and frequency applied to each phase modulator of the cascade of Sagnac interferometers and providing an output data stream rate from each interferometer one-half of the input data rate which is applied in series to a succeeding interferometer in the cascade;

means for preventing a retroreflected optical light from each interferometer from interfering with the optical light in the preceding interferometer;

means for shifting a polarization of the counterclockwise optical light in each interferometer;

a last interferometer of the cascade of interferometers outputting an optical signal with the low-speed data stream superimposed thereon which is applied to a receiver for conversion to the electronic domain.

15. A method for converting a high-speed data stream into a low-speed data stream comprised of the steps of:

modulating an input optical data stream in a series of Sagnac interferometers with a microwave radio frequency signal at a predetermined frequency and power so that the output optical data stream rate is one-half the input data stream rate for each interferometer of the series of interferometers; and converting the output optical data stream to an electronic domain.

16. An optical demultiplexer for converting an optical channel containing a high-speed data stream into a low-speed data stream comprised of:

means for applying an optical signal with the high-speed data stream superimposed thereon;

a plurality of Sagnac interferometers, in cascade, each interferometer further comprised of a modulator, having a traveling wave electrode structure;

each interferometer further comprised of a phase modulator and a 90° cross splice reverse the polarization axes;

a microwave radio frequency signal at a preselected power level and frequency applied to each phase modulator for modulating a high-speed input data stream applied to each interferometer, in the cascade, providing an output data stream rate from each interferometer one-half of the input data rate which is applied in series to a succeeding interferometer in the cascade;

means for preventing a retroreflected optical light from each interferometer from interfering with the optical light in the preceding interferometer and redirecting an unused data stream from each interferometer to another network;

means for delaying the unused data stream redirected to another node;

means for injecting a data stream from another node into the input data stream;

means for shifting the bias phase of the output of a last interferometer to quadrature;

a last interferometer of the cascade of interferometers outputting an optical signal with a low-speed data stream superimposed thereon which is applied to a receiver for conversion to the electronic domain; and means for directing unwanted data from the input data stream.

* * * * *